United States Patent [19]

Jones et al.

[11] 4,327,160

[45] Apr. 27, 1982

[54] NON-AQUEOUS CELL

[75] Inventors: Steven D. Jones, Brook Park; George E. Blomgren, Lakewood, both of Ohio

[73] Assignee: Union Carbide Corporation, Danbury, Conn.

[21] Appl. No.: 220,282

[22] Filed: Dec. 29, 1980

[51] Int. Cl.$^3$ .............................................. H01M 6/16
[52] U.S. Cl. .................................... 429/101; 429/105; 429/213
[58] Field of Search ................ 429/101, 105, 196, 213

[56] References Cited

U.S. PATENT DOCUMENTS 3,764,385 10/1973 Langer et al. ........................ 429/213
3,775,153 11/1973 Paulson ................................ 429/213

*Primary Examiner*—Donald L. Walton
*Attorney, Agent, or Firm*—Cornelius F. O'Brien

[57] ABSTRACT

A non-aqueous electrochemical cell employing a liquid cathode comprising an organo halide of at least one element selected from Group IVA and Group VA of the Periodic Table and having an atomic number of 14 or more.

14 Claims, No Drawings

NON-AQUEOUS CELL

FIELD OF THE INVENTION

The invention relates to a non-aqueous electrochemical cell employing a liquid cathode comprising an organo halide of at least one element selected from Group IVA and Group VA of the Periodic Table and having an atomic number of 14 or more.

BACKGROUND OF THE INVENTION

The development of high energy battery systems requires, among other things, the compatibility of an electrolyte solution possessing desirable electrochemical properties with highly reactive anode materials, such as lithium or the like. The use of aqueous electrolytes is precluded in those systems since the anode materials are sufficiently active to react with water chemically. It has, therefore, been necessary, in order to realize the high energy density obtainable through use of these highly reactive anodes, to turn to the investigation of non-aqueous electrolyte systems.

The term "non-aqueous electrolyte" as used herein refers to an electrolyte solution which is composed of a solute, such as, for example, a metal salt or a complex salt of Group IA, Group IIA, Group IIIA or Group VA elements of the Periodic Table, dissolved in an appropriate nonaqueous solvent. The term "Periodic Table" as used herein refers to the Periodic Table of Elements as set forth on the front cover of the Handbook of Chemistry and Physics, 60th Edition, The CRC Press Inc., Boca Raton, Fla., 1979–1980.

A multitude of solutes is known and many have been suggested for use but the selection of a suitable solvent has been particularly troublesome. The ideal battery electrolyte would comprise a solvent-solute pair which has a long liquid range, high ionic conductivity and stability. A long liquid range, i.e., high boiling point and low freezing point, is essential if the battery is to operate at other than normal ambient temperatures. High ionic conductivity is necessary if the battery is to have high rate capability. Stability is necessary with the electrode materials, the materials of cell construction, and the products of the cell reaction to provide long shelf life when used in a primary or secondary battery system.

It has been disclosed in the literature that certain materials are capable of acting both as an electrolyte carrier, i.e., as solvent for the electrolyte salt, and as the active cathode for a non-aqueous electrochemical cell. U.S. Pat. Nos. 3,475,226, 3,567,515 and 3,578,500 each disclose that liquid sulfur dioxide or solutions of sulfur dioxide and a co-solvent will perform this dual function in non-aqueous electrochemical cells. While these solutions perform their dual function, they are not without several disadvantages in use. Sulfur dioxide is always present and, being a gas at ordinary temperatures, it must be contained in the cell as a liquid under pressure or dissolved in a liquid solvent. Handling and packaging problems are created if the sulfur dioxide is used alone, and an additional component and assembly step are necessary if sulfur dioxide is to be dissolved in a liquid solvent. As stated above, a long liquid range encompassing normal ambient temperatures is a desirable characteristic in an electrolyte solvent. Obviously, sulfur dioxide is deficient in this respect at atmospheric pressure.

U.S. application Ser. No. 439,521 by G. E. Blomgren et al., filed Feb. 4, 1974 discloses a non-aqueous electrochemical cell comprising an anode, a cathode collector and a cathode-electrolyte, said cathode-electrolyte comprising a solution of an ionically conductive solute dissolved in an active cathode depolarizer wherein said active cathode depolarizer consists of a liquid oxyhalide of an element of Group V or Group VI of the Periodic Table.

U.S. application Ser. No. 474,267 by G. E. Blomgren et al., filed May 29, 1974, discloses a non-aqueous electrochemical cell employing a cathode-electrolyte consisting of an ionizing solute dissolved in a liquid halide solvent and a cosolvent, said liquid halide being selected from the group consisting of sulfur monochloride ($S_2Cl_2$), sulfur monobromide ($S_2Br_2$), selenium tetrafluoride ($SeF_4$) selenium monobromide ($Se_2Br_2$), thiophosphoryl chloride ($PSCl_3$), thiophosphoryl bromide ($PSBr_3$), vanadium pentafluoride ($VF_5$), lead tetrachloride ($PbCl_4$), titanium tetrachloride ($TiCl_4$), disulfur decafluoride ($S_2F_{10}$), tin bromide trichloride ($SnBrCl_3$), tin dibromide dichloride ($SnBr_2Cl_2$) and tin tribromide chloride ($SnBr_3Cl$).

One of the objects of the present invention is to provide a new group of cathodic materials for use in non-aqueous cells that has a long liquid range.

Another object of the present invention is to provide a new group of liquid cathodic materials that are relatively stable with anodes, such as lithium, and have a relatively low reactivity with atmospheric water vapor, thus making them suitable for use in non-aqueous cell systems.

The foregoing and additional objects will become more fully apparent from the following description.

SUMMARY OF THE INVENTION

The invention relates to a non-aqueous electrochemical cell comprising an anode, a cathode collector and a cathode-electrolyte solution comprising an ionizing solute dissolved in a solvent and wherein said cathode-electrolyte contains as an active cathode material an organo halide of at least one element selected from the group consisting of Group IVA and Group VA of the Periodic Table and having an atomic number of 14 or more.

A cathode material is the active cathode reactant and, therefore, is the material electrochemically reduced at the cathode collector. The cathode collector, whether inert or active, primarily functions as a current collector plus electronic conductor to the cathode terminal of a cell. In other words, the cathode collector when used in conjunction with a liquid active cathode material, is a situs for the electrochemical reduction reaction of the active cathode material and the electronic conductor to the cathode terminal of a cell.

A liquid active reducible cathode material is usually mixed with an ionizing solute to improve the conductivity of the liquid active reducible cathodic material or mixed with both an ionizing solute and a cosolvent material. A solid active reducible cathode material can be dissolved in a solvent where it will then be a liquid phase. Consequently in the subject invention some of the organo halides may function as solvents for the cathode-electrolyte solution but generally an additional solvent may be required to improve the solubility of the solute to render the cathode-electrolyte sufficiently conductive for use in cell applications. In the case of the solid active materials at room temperature, such as $CH_3SnCl_3$, a solvent will be required to dissolve both the solute and the solid active material. In this latter case, the dissolved active material will be present in a liquid phase in the cathode-electrolyte solution.

Of the organo halides of Group IVA and Group VA of the Periodic Table, carbon and nitrogen are not included. Nitrogen is excluded because of the room temperature instability of nitrogen organo halides and carbon is excluded because many of its organo halides are inactive electrochemically and some are chemically reactive with active metal anodes such as lithium. The organo halides suitable for use in this invention have to be electrochemically reducible and effectively chemically stable in the cell system during storage.

One embodiment of the organo halides of this invention is represented by the generic formula:

$$R_m Z X_n$$

where R is an organic radical of a saturated alkyl group with a chain length of 1 to 6 carbon atoms, e.g., $CH_3$ or $CH_3CH_2$; an unsaturated alkyl group with a chain length of 2 to 6 carbon atoms, e.g., $CH_2=CH$; a substituted alkyl group with a chain length of 1 to 6 carbon atoms (saturated) or 2 to 6 carbon atoms (unsaturated), e.g., $CF_3$, $CHF_2$, $CF_2=CF$; an alkoxy or substituted alkoxy group with a carbon chain length of 1 to 6 carbon atoms, e.g., $CH_3-O$, $FCH_2CH_2O$; unsaturated alkoxy group with a carbon chain length of 2 to 6 carbon atoms (substituted or unsubstituted), e.g., $CH_2=CH-CH_2O$, $CF_2=CH-CH_2O$; a substituted or unsubstituted aryl group, e.g., $C_6H_5$, $FC_6H_4$, $CH_3C_6H_4$; a substituted or unsubstituted aryloxy group, e.g., $C_6H_5-O$, $FC_6H_4-O$; a substituted or unsubstituted alkylthio group with a carbon chain length of 1 to 6 carbon atoms, e.g., $C_2H_5-S$, $FC_2H_4-S$; or a substituted or unsubstituted arylthio group, e.g., $C_6H_5-S$, $FC_6H_4-S$;

where Z is an element of Group IVA or VA of the Period Table, e.g., Si, P, Sn, Sb, with the proviso that the element is tetravalent if of Group IVA, or trivalent or pentavalent if of Group VA;

where X is a halogen, e.g., Cl, Br;

where n has a value between 1 and 3 for tetravalent element Z, 1 or 2 for trivalent element Z, or between 1 and 4 for pentavalent element Z; and where n takes a value such that m+n is equal to the valence of element Z, e.g., for tetravelent Z, n=4−m.

Alternatively, R can be a bifunctional organic radical with a chain length of 4 to 6 atoms in which the two ends are bonded to the atom Z to make a heterocyclic ring compound and m=1 and n=valence of Z−2. In this case R may preferably be composed of all methylene or substituted methylene groups, e.g., $(CH_2)_4$, or methylene groups and oxygen or sulfur atoms, e.g., $(CH_2O)_2$.

A second embodiment of the organo halides for use in this invention is represented by the generic formula:

$$X_m Z'R'Z''Y_n$$

where Z' and Z'' are elements of Group IVA or VA of the Periodic Table as defined above for Z and are either the same or different;

where X and Y are halogens;

where R' is a bifunctional organic radical with a chain length of 1 to 6 atoms selected from the group consisting of carbon, carbon and oxygen, and carbon and sulfur which bridges across from Z' to Z'' and is chemically bonded to both, e.g., $-CH_2CH_2-$; and where m and n are each one less than the valence of the element Z' and Z'', respectively.

It is believed that the presence of the organic radical R or R' reduces the reactivity of the compound both with atmospheric water and with light metal (Group IA or IIA) anode materials, compared with the corresponding inorganic halides.

Examples of suitable organo halides for use in this invention along with their melting points (m.p.), if known, and their boiling points (b.p.) are shown in Table 1.

TABLE 1

| Compound | m.p. (°C.) | b.p. (°C.) |
|---|---|---|
| $CH_3PCl_2$ | −67 | 81.5 |
| $C_2H_5PCl_2$ | — | 111.85 |
| $CH_3OPCl_2$ | — | 95 to 96 |
| $C_6H_5PCl_2$ | −46 to −48 | 221.85 |
| $(C_6H_5)_2PCl$ | 15 to 16 | 320 |
| $(CH_2O)_2PCl$ | — | 41.5 (10 mm) |
| $Cl_2P(CH_2)_2PCl_2$ | — | 81 to 82 (2 mm) |
| $(CH_3)_2SiCl_2$ | — | 70.0 |
| $(C_2H_5)_2SiCl_2$ | — | 129 |
| $(C_2H_5O)_2SiCl_2$ | — | 136 |
| $(CH_3)SiCl_3$ | — | 65.7 |
| $(CH_3)_2SiBr_2$ | — | 112.3 |
| $(CH_3)_2SbCl_3$ | — | decomposes |
| $C_4H_9SnCl_3$ | −63 | 98 (10 mm) |
| $C_6H_5SnCl_3$ | — | 142 (25 mm) |
| $C_6H_5SnBr_3$ | — | 182 (29 mm) |
| $CH_3SnCl_3$ | 43 | 171 |
| $CH_3SnBr_3$ | 53 to 55 | 210 to 211 (746mm) |

Of the above, some may be solid at ambient temperature or above but would function as liquid cathode materials when dissolved in a suitable solvent in accordance with this invention. Of the above, the preferable would be $CH_3PCl_2$, $C_2H_5PCl_2$, $CH_3OPCl_2$, and $C_6H_5PCl_2$, with $CH_3PCl_2$ being the most preferable.

Any compatible solid (inert or active) which is substantially electronically conductive may be useful as a cathode collector in the cells of the present invention. It is desirable to have as much surface contact as possible between the cathode-electrolyte and the collector. It is, therefore, preferred to employ a porous collector since it will provide a high surface area interface with the liquid cathode-electrolyte. The collector may be metallic and may be present in any physical form such as a metallic film, screen or a pressed powder. Preferably, however, a pressed powder collector should be at least partially of carbonaceous or other high surface area material.

The solute may be a simple or double salt which will produce an ionically conductive solution when dissolved in the solvent. Preferred solutes are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226—July/December, 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorous pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

Useful organic solvents which may be used in this invention along with the organo halides would include the following classes of compounds:

Trialkyl borates: e.g., trimethyl borate, $(CH_3O)_3B$ (liquid range, $-29.3°$ to $67°$ C.)

Tetraalkyl silicates: e.g., tetramethyl silicate, $(CH_3O)_4Si$ (boiling point, $121°$ C.)

Nitroalkanes: e.g., nitromethane, $CH_3NO_2$ (liquid range, $-17°$ to $100.8°$ C.)

Alkylnitriles: e.g., acetonitrile, $CH_3CN$ (liquid range, $-45°$ to $81.6°$ C.)

Dialkylamides: e.g., dimethylformamide, $HCON(CH_3)_2$ (liquid range, $-60.48°$ to $149°$ C.)

Lactams: e.g., N-methylpyrrolidone,

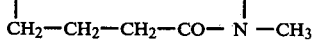

(liquid range, $-16°$ to $202°$ C.)

Tetraalkylureas: e.g., tetramethylurea, $(CH_3)_2N-CO-N(CH_3)_2$ (liquid range, $-1.2°$ to $166°$ C.)

Monocarboxylic acid esters: e.g., ethyl acetate (liquid range, $-83.6°$ to $77.06°$ C.)

Orthoesters: e.g., trimethylorthoformate, $HC(OCH_3)_3$ (boiling point, $103°$ C.)

Lactones: e.g., γ-(gamma)butyrolactone,

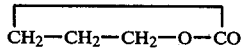

(liquid range, $-42°$ to $206°$ C.)

Dialkyl carbonates: e.g., dimethyl carbonate, $OC(OCH_3)_2$ (liquid range, $2°$ to $90°$ C.)

Alkylene carbonates: e.g., propylene carbonate,

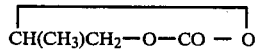

(liquid range, $-48°$ to $242°$ C.)

Monoethers: e.g., diethyl ether (liquid range, $-116°$ to $34.5°$ C.)

Polyethers: e.g., 1,1- and 1,2-dimethoxyethane (liquid ranges, $-113.2°$ to $64.5°$ C. and $-58°$ to $83°$ C., respectively)

Cyclic ethers: e.g., tetrahydrofuran (liquid range, $-65°$ to $67°$ C.); 1,3-dioxolane (liquid range, $-95°$ to $78°$ C.)

Nitroaromatics: e.g., nitrobenzene (liquid range, $5.7°$ to $210.8°$ C.)

Aromatic carboxylic acid halides: e.g., benzoyl chloride (liquid range, $0°$ to $197°$ C.); benzoyl bromide (liquid range, $-24°$ to $218°$ C.)

Aromatic sulfonic acid halides: e.g., benzene sulfonyl chloride (liquid range, $14.5°$ to $251°$ C.)

Aromatic phosphonic acid dihalides: e.g., benzene phosphonyl dichloride (boiling point, $258°$ C.)

Aliphatic phosphonic acid dihalids: e.g. methyl phosphonyl dichloride (b.p. $162°$ C.)

Aromatic thiophosphonic acid dihalides: e.g., benzene thiophosphonyl dichloride (boiling point, $124°$ C. at 5 mm.)

Cyclic sulfones: e.g., sulfolane,

(melting point $22°$ C.); 3-methylsulfolane (melting point, $-1°$ C.)

Alkyl sulfonic acid halides: e.g., methanesulfonyl chloride (boiling point, $161°$ C.)

Alkyl carboxylic acid halides: e.g., acetyl chloride (liquid range, $-112°$ to $50.9°$ C.); acetyl bromide (liquid range, $-96°$ to $76°$ C.); propionyl chloride (liquid range, $-94°$ to $80°$ C.)

Saturated heterocyclics: e.g., tetrahydrothiophene (liquid range, $-96°$ to $121°$ C.); 3-methyl-2-oxazolidone (melting point, $15.9°$ C.)

Dialkyl sulfamic acid halides: e.g., dimethyl sulfamyl chloride (boiling point, $80°$ C., 16 mm.)

Alkyl halosulfonates: e.g., ethyl chlorosulfonate (boiling point, $151°$ C.)

Unsaturated heterocyclic carboxylic acid halides: e.g., 2-furoyl chloride (liquid range, $-2°$ to $173°$ C.)

Five-membered unsaturated heterocyclics: e.g., 3,5-dimethylisoxazole (boiling point, $140°$ C.); 1-methylpyrrole (boiling point, $114°$ C.); 2,4-dimethylthiazole (boiling point, $144°$ C.); furan (liquid range, $-85.65°$ to $31.36°$ C.)

Esters and/or halides of dibasic carboxylic acids: e.g., ethyl oxalyl chloride (boiling point, $135°$ C.)

Mixed alkyl sulfonic acid halides and carboxylic acid halides: e.g., chlorosulfonyl acetyl chloride (boiling point: $98°$ C. at 10 mm.)

Dialkyl sulfoxides: e.g., dimethyl sulfoxide (liquid range, $18.4°$ to $189°$ C.)

Dialkyl sufates: e.g., dimethylsulfate (liquid range, $-31.75°$ to $188.5°$ C.)

Dialkyl sulfites: e.g., dimethylsulfite (boiling point, $126°$ C.)

Alkylene sulfites: e.g., ethylene glycol sulfite (liquid range, $-11°$ to $173°$ C.)

Of the above, the cosolvents believed to be preferred are nitrobenzene; nitropropane; tetrahydrofuran; 1,3-dioxolane; 3-methyl-2-oxazolidone; propylene carbonate; γ-butyrolactone; sulfolane; ethylene glycol sulfite; dimethyl sulfite, acetyl chloride and benzoyl chloride. Of the preferred cosolvents, the most preferred are nitropropane and acetyl chloride because they are more chemically inert to battery components and have long liquid ranges, and especially because they permit highly efficient utilization of the cathode materials.

It is also within this invention to employ, in addition to the organo halides, inorganic solvents such as inorganic oxyhalides or halides. These oxyhalide and halides, in addition to functioning as an electrolyte solvent in nonaqueous cells, may also function as an active reducible cathode thereby contributing to the overall active reducible material in such cells.

Useful anode materials are generally consumable metals and include aluminum, the alkali metals, alkaline earth metals and alloys of alkali metals or alkaline earth metals with each other and other metals. The term "alloy" as used herein and in the appended claims is intended to include mixtures, solid solutions such as lithium-magnesium, and intermetallic compounds such as lithium monoaluminide. The preferred anode materials are the alkali metals such as lithium, sodium and potassium, and alkaline earth metals such as calcium. The most preferred anode material is lithium.

In selecting the particular organo halide for a particular cell in accordance with this invention, one should also consider the stability of the particular organo halide in the presence of the other cell components and operating temperatures at which the cell is expected to perform. Thus, an organo halide should be selected that will be stable in the presence of the other cell components and be electrochemically reducible in the cell system.

In addition, if it is desired to render the electrolyte solution more viscous or convert it into a gel, a gelling agent such as colloidal silica may be added.

The following examples are illustrative of the present invention and are not intended in any manner to be limitative thereof.

EXAMPLE I

A 0.475 inch diameter, 1.65 inch high experimental cylindrical cell was constructed with a lithium anode, 2.4 ml of a cathode-electrolyte of $POCl_3:CH_3PCl_2$ (methyl dichlorophosphine) in a 1:2 molar ratio containing 0.5 M $LiAlCl_4$ and a porous carbon cathode collector. The cell was continuously discharged across a 250-ohm load to a 1-volt cutoff delivering 0.70 ampere hours (AH) at an average discharge voltage of about 2.6 volts.

EXAMPLE II

An experimental cell was constructed as in Example I except that the methyl dichlorophosphine was obtained from a different company. The cell was discharged as in Example I to a 1-volt cutoff delivering 0.78 AH at an average discharge voltage of about 2.0 volts.

EXAMPLE III

Two experimental cells were constructed as in Example II except that in each cell the molar ratio of the $POCl_3$ to $CH_3PCl_2$ is as shown in Table 3. Each cell was discharged across a 250-ohm load to a 1-volt cutoff and the discharge capacity delivered is shown in Table 3.

TABLE 3

| Cell | $POCl_3$ to $CH_3PCl_2$ | Discharge Capacity (AH) |
|---|---|---|
| 1 | 2:1 | 0.49 |
| 2 | 1:1 | 0.67 |

EXAMPLE IV

An experimental cell as in Example I was constructed using a lithium anode, 2.4 ml of a cathode-electrolyte of $CH_3PCl_2:CH_3COCl$ in a 2:1 molar ratio containing 0.5 M $LiAlCl_4$ and a porous carbon cathode collector. The cell was continuously discharged across a 250-ohm load to a 1-volt cutoff delivering 0.21 AH.

EXAMPLE V

An experimental cell as in Example I was constructed using a lithium anode, 2.4 ml of a cathode-electrolyte of $CH_3POCl_2:CH_3PCl_2$ in a 1:2 molar ratio containing 0.5 M $LiAlCl_4$ and a porous carbon cathode collector. The cell was continuously discharged across a 250-ohm load to a 1-volt cutoff, delivering 0.36 AH.

EXAMPLE VI

Several additional cells were constructed as in Example I using a lithium anode, 2.4 ml of a cathode-electrolyte as shown in Table 4 in a 1:1 molar ratio containing 0.5 M $LiAlCl_4$ and a porous carbon cathode collector. The cells were each discharged across a 250-ohm load and the time required to reach a 1-volt cutoff is shown in Table 4.

TABLE 4

| | $R_nPCl_{3-n}:POCl_3$ | | | |
|---|---|---|---|---|
| "R" | Co-Solvent | Load (ohms) | Average Discharge Voltage (Volts) | Hours to 1.0V |
| $C_2H_5$ | $POCl_3$ | 250 | 2.1 | 56 |
| $CH_3O$ | $POCl_3$ | 250 | 1.9 | 35 |
| $(C_6H_5)_2$ | $POCl_3$ | 250 | 1.9 | 12 |
| $C_6H_5$ | $POCl_3$ | 250 | 2.6 | 30 |

EXAMPLE VII

Two experimental cells were constructed as in Example I each using a lithium anode, 2.4 ml of a cathode-electrolyte of $POCl_3:CH_3PCl_2$ in a 1:2 molar ratio containing 0.5 M $LiAlCl_4$ and a porous carbon cathode collector. One of the cells was immediately discharged across a 250-ohm load to a 1-volt cutoff delivering 0.64 AH. The second cell was stored for about 20 days at room temperature and then discharged across a 250-ohm load to a 1-volt cutoff, delivering 0.54 AH.

EXAMPLE VIII

Three cells were constructed as in Example I. One of the cells was discharged across a 75-ohm load and delivered 0.57 AH. to a 1-volt cutoff. The second cell was discharged across a 250-ohm load and delivered 0.79 AH to a 1-volt cutoff. The third cell was discharged across a 500-ohm load and delivered 0.78 AH.

While the present invention has been described with reference to many particular details thereof, it is not intended that these details should be construed as limiting the scope of the invention.

Which is claimed:

1. A non-aqueous electrochemical cell comprising an anode, a cathode collector and a cathode-electrolyte solution comprising an ionizing solute dissolved in a solvent and wherein said cathode-electrolyte contains as an active cathode material an organo halide of at least one element selected from the group consisting of Group IVA and Group VA of the Periodic Table and having an atomic number of 14 or more.

2. The non-aqueous cell of claim 1 wherein the organo halide is represented by the generic formula:

$$R_m Z X_n$$

where R is an organic radical of a saturated alkyl group with a chain length of 1 to 6 carbon atoms; an unsaturated alkyl group with a chain length of 2 to 6 carbon atoms; a substituted alkyl group with a chain length of 1 to 6 carbon atoms (saturated) or 2 to 6 carbon atoms (unsaturated); an alkoxy or substituted alkoxy group with a carbon chain length of 1 to 6 carbon atoms; an unsaturated alkoxy group with a carbon chain length of 2 to 6 carbon atoms (substituted or unsubstituted); a substituted or unsubstituted aryl group; a substituted or unsubstituted aryloxy group; a substituted or unsubstituted alkylthio group with a carbon chain length of 1 to 6 carbon atoms; or a substituted or unsubstituted arylthio group;

where Z is an element of Group IVA or VA of the Period Table with the proviso that the element is tetravalent if of Group IVA, or trivalent or pentavalent if of Group VA;

where X is a halogen;

where n has a value between 1 and 3 for tetravalent element Z, 1 or 2 for trivalent element Z, or between 1 and 4 for pentavalent element Z; and where n takes a value such that m+n is equal to the valence of element Z.

3. The non-aqueous cell of claim 1 wherein the organo halide is represented by the generic formula:

$$R_m Z X_n$$

where Z is an element of Group IVA or VA of the Periodic Table; where X is a halogen; and where R is a bifunctional organic radical with a chain length of 4 to 6 atoms in which the two ends are bonded to the atom Z to make a heterocyclic ring compound in which m=1 and n=valence of Z−2.

4. The non-aqueous cell of claim 1 wherein the organo halide is represented by the generic formula:

$$X_m Z' R' Z'' Y_n$$

where Z' and Z'' are each an element of Group IVA or VA of the Periodic Table with the proviso that the element is tetravalent if of Group IVA or trivalent or pentavalent if of Group VA;

where X and Y are halogens;

where R' is a bifunctional organic radical with a chain length of 1 to 6 atoms selected from the group consisting of carbon, carbon and oxygen, and carbon and sulfur, which bridges across from Z' to Z'' and is chemically bonded to both; and where m and n are each one less than the valence of the element Z' and Z'', respectively.

5. The non-aqueous cell of claim 1 wherein the organic halide is selected from the group consisting of: $CH_3PCl_2$; $C_2H_5PCl_2$; $CH_3OPCl_2$; $C_6H_5PCl_2$; $(C_6H_5)_2PCl$; $(CH_2O)_2PCl$; $Cl_2P(CH_2)_2PCl_2$; $(CH_3)_2SiCl_2$; $(C_2H_5)_2SiCl_2$; $(CH_3)SiCl_3$; $(CH_3)_2SiBr_2$; $(CH_3)_2SbCl_3$; $C_4H_9SnCl_3$; $C_6H_5SnCl_3$; $C_6H_5SnBr_3$; $CH_3SnCl_3$ and $CH_3SnBr_3$.

6. The non-aqueous cell of claims 1, 2, 3, 4 or 5 wherein a solvent other than the organo halide is present in the cathode-electrolyte.

7. The non-aqueous cell of claim 6 where the solvent is selected from the group consisting of $POCl_3$, $CH_3POCl_2$, $CH_3COCl$ and nitropropane.

8. The non-aqueous cell of claim 1 wherein the organo halide is $CH_3PCl_2$.

9. The non-aqueous cell of claim 6 wherein the organo halide is $CH_3PCl_2$ and the solvent is $POCl_3$.

10. The non-aqueous cell of claim 5 wherein the organo halide is $C_2H_5PCl_2$.

11. The non-aqueous cell of claim 5 wherein the organo halide is $CH_3OPCl_2$.

12. The non-aqueous cell of claim 5 wherein the organo halides is $C_6H_5PCl_2$.

13. The non-aqueous cell of claim 1, 2, 3 or 4 wherein the solute is a complex salt of a Lewis acid and an inorganic ionizable salt.

14. The non-aqueous cell of claim 1, 2, 3 or 4 wherein the anode is selected from the group consisting of lithium, sodium, calcium and potassium.

* * * * *